March 4, 1941.  I. H. JEWELL  2,233,980
METHOD OF AND APPARATUS FOR FILTRATION
Filed Jan. 21, 1937    5 Sheets-Sheet 4
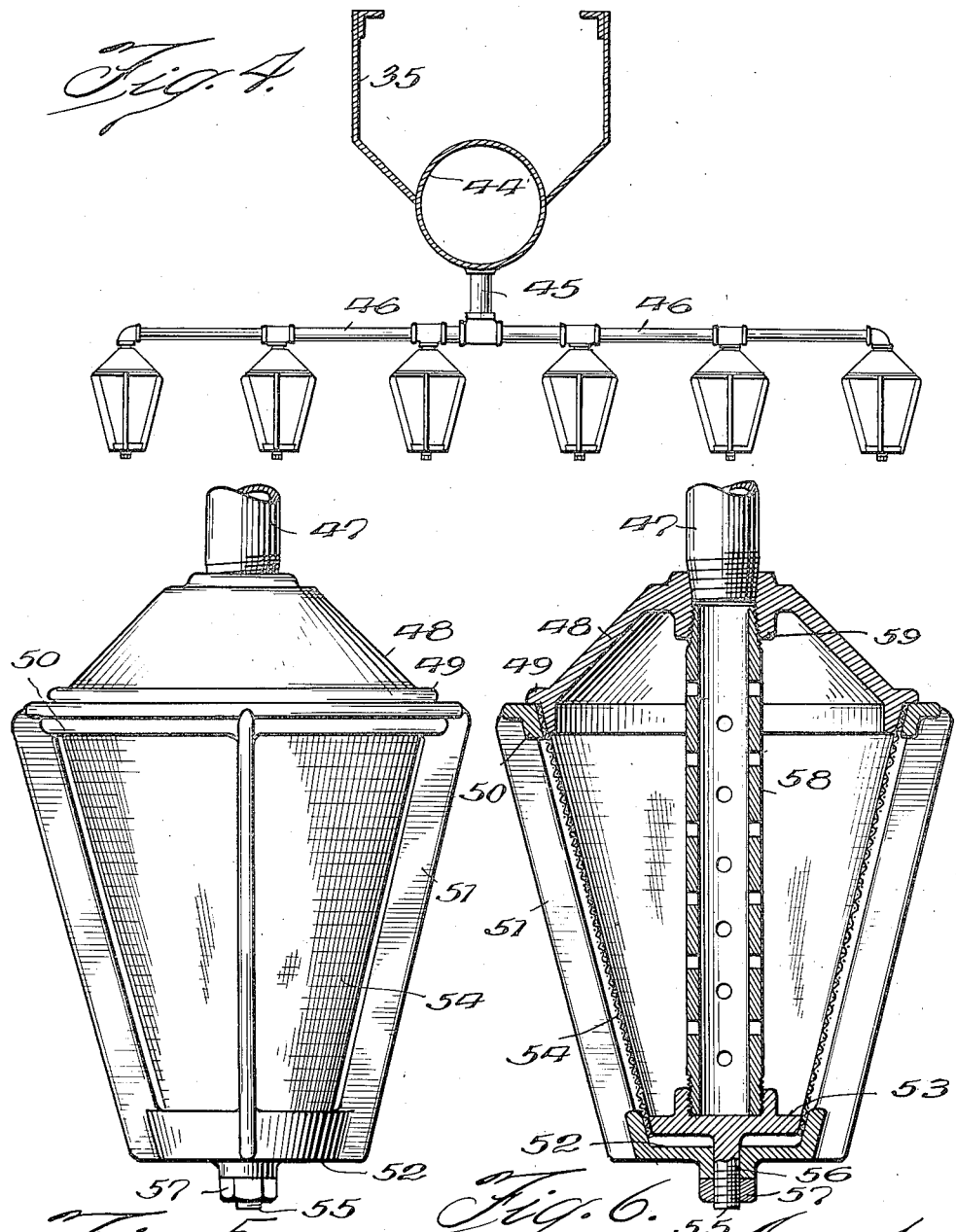

March 4, 1941.　　I. H. JEWELL　　2,233,980
METHOD OF AND APPARATUS FOR FILTRATION
Filed Jan. 21, 1937　　5 Sheets-Sheet 5
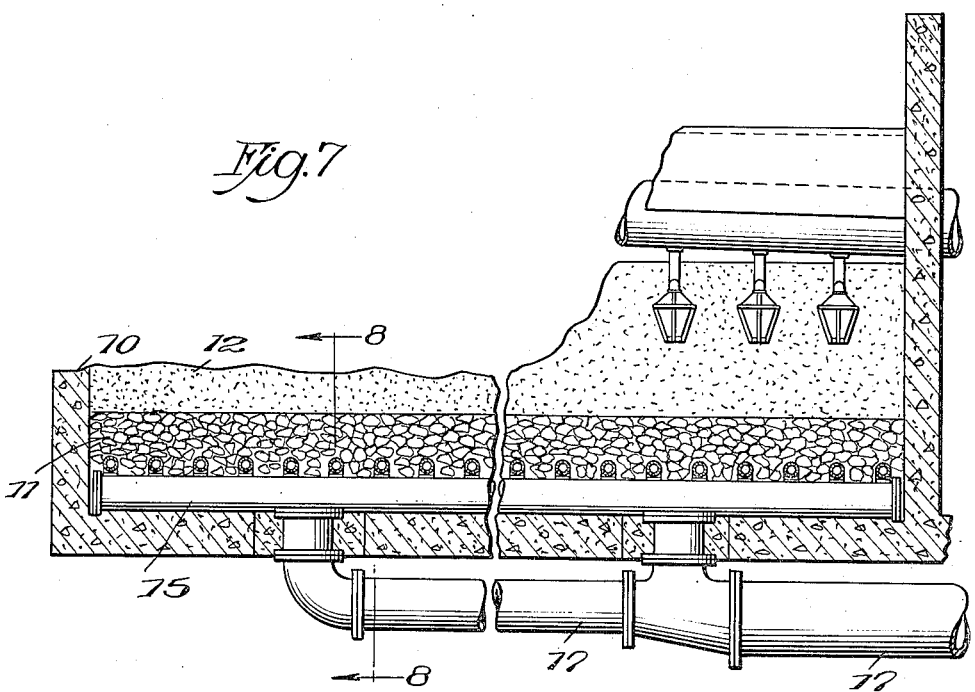
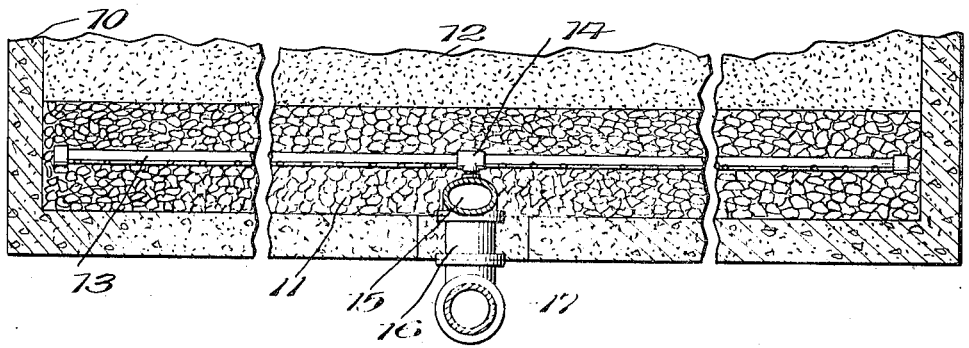
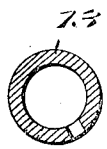
Inventor:
Ira H. Jewell
By John Howard McElroy,
his Atty.

Patented Mar. 4, 1941

2,233,980

UNITED STATES PATENT OFFICE 2,233,980

METHOD OF AND APPARATUS FOR FILTRATION

Ira H. Jewell, Evanston, Ill.

Application January 21, 1937, Serial No. 121,676

10 Claims. (Cl. 210—130)

My invention is concerned with the art of filtration whereby large supply of pure water can be secured from any available source of water, and at a minimum cost of expenditure for apparatus and at a minimum cost for operation and upkeep.

To secure this desired result, it consists of a novel method of filtration first disclosed in my application No. 698,852, filed Nov. 20, 1933, and subsequently disclosed and claimed in my application No. 702,907, filed Dec. 18, 1933; and a novel method of washing filter beds disclosed and claimed broadly in my aforesaid application No. 698,852, which methods when combined in use in the same plant secure the desired results set out in the preceding paragraph. So far as the method claims of the present application are concerned, they are a continuation of, or a division from the aforesaid applications, from which the method claims were canceled for the purpose of the present application.

The novel structure herein disclosed is one which I consider well adapted for use in carrying out the aforesaid methods.

As ordinarily constructed, a rapid sand filtration plant consists of a suitably retained bed of sand resting upon a gravel base and provided with inlet and effluent means, so that water supplied thereto and standing thereon will descend in the process of filtration directly downward through the sand body and gravel beds. The water is supplied with a coagulant, and that together with the impurities extracted therefrom in time forms a coating of the top of the sand bed which the water penetrates with difficulty, with the result that its rate of operation is increasingly slowed down so much that it eventually becomes necessary to wash the sand by reversing the flow of water therethrough.

In my present application, I have shown embedded in the sand a plurality of discharge members, each of considerable cubic capacity, and having the sides thereof formed of a fine mesh wire screen, preferably of a No. 35 rectangular mesh, adapted to prevent the entry of the filtering sand, which is usually of a .5 millimeter size. I connect them with supply pipes, and preferably support them from the wash water troughs customarily employed in the municipal filter plants. This novel structure enables me to carry out the novel methods hereinafter described and specifically pointed out in the claims.

To illustrate my invention, I annex hereto five sheets of drawings, in which the same reference characters are used to designate identical parts in all the figures, of which—

Fig. 4 is an enlarged section through one of the troughs with a row of the discharge members attached;

Figs. 5 and 6 are an elevation and a central vertical section, respectively, of one of the discharge members on a still larger scale;

Fig. 7 is a vertical section on the line 7—7 of Fig. 8;

Fig. 8 is a vertical section on the line 8—8 of Fig. 7; and

Fig. 9 is an enlarged detail in section through one of the effluent collecting tubes.

Figure 1:
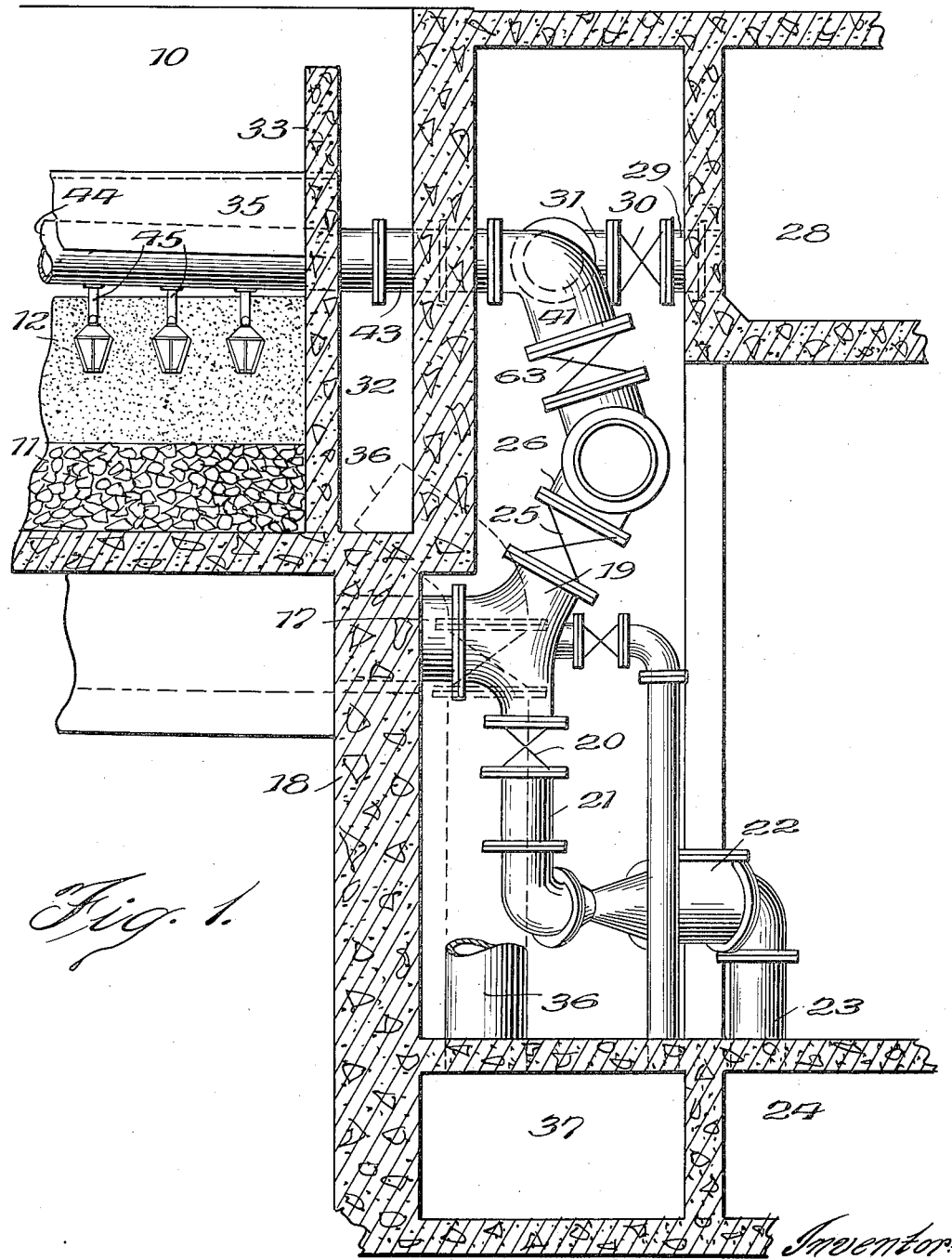
Fig. 1 is a vertical section of a portion of a filter plant, as seen from the left of Figs. 2 and 3, with some of the parts broken away, and with the valves indicated diagrammatically.

Referring first to Figs. 1-3, and 7-9, I employ the customary chamber 10, which has on its bottom the customary gravel bed 11, on which the sand bed 12 is supported in the customary manner and with the gravel bed having therein the customary supply of perforated tubes 13 connected by the T's 14 to the common outlet pipe 15 in the bottom of the chamber 10, which has connections 16 through the bottom of the chamber to the piping 17, which, as seen in Fig. 1 passes through the wall 18 and is connected to the irregular T 19; the lower end of which is connected by the diagrammatically indicated valve 20 to the piping 21 connected to the rate of flow controller 22, which, through the pipe 23, discharges into the clear water flume 24. The upper end of the T 19 is connected by the valve 25 with the T 26 (see Fig. 3) which is connected at one end with the wash water pipe 27 which supplies wash water at any desired pressure through the piping just described to the effluent tubes 13, so that the sand bed can be washed by a reverse flow.

The unfiltered water flume 28 has a short pipe 29 connected by the valve 30 (see Figs. 2 and 3) with the pipe 31 which opens into the narrow channel 32 formed by the side of the chamber 10, and the partition 33 which has the openings 34 therein of a shape to receive the ends of the troughs 35 extending across the chamber. During the filtering operation, the valves 30 and 20 are opened, and the valve 25 closed, so that the unfiltered water entering the channel 32 overflows into the troughs and stands on the sand bed up to the top of the partition 33, thereby forming a uniform head, and passes down through the sand bed 12 out through the tubes 13, then through the piping 15 and 16, the T 19, and through the rate of flow controller 22 into the clear water flume whence it is distributed to the city mains. The structure so far described is, generally speaking, that generally used. When the sand has to be washed, under the common practice used prior to my invention, the valves 20 and 30 are closed and the valve 25 opened. The wash water from the pipe 27 under a considerable pressure that can be controlled in the customary well known manner now passes through the T 26, valve 25, T 19 on the piping 15 and 17, and is discharged rapidly through the tubes 13 and rises through the gravel, and lifts the sand bed as nearly to the top of the troughs 35 as is desirable, as obviously the sand must not be allowed to spill into the trough with the wash water which enters the channel 32 and escapes therefrom through the pipe 36, the upper portion of which, broken away in Fig. 1 is indicated in dotted lines. This pipe 36 opens into the sewer 37.

Figure 2:
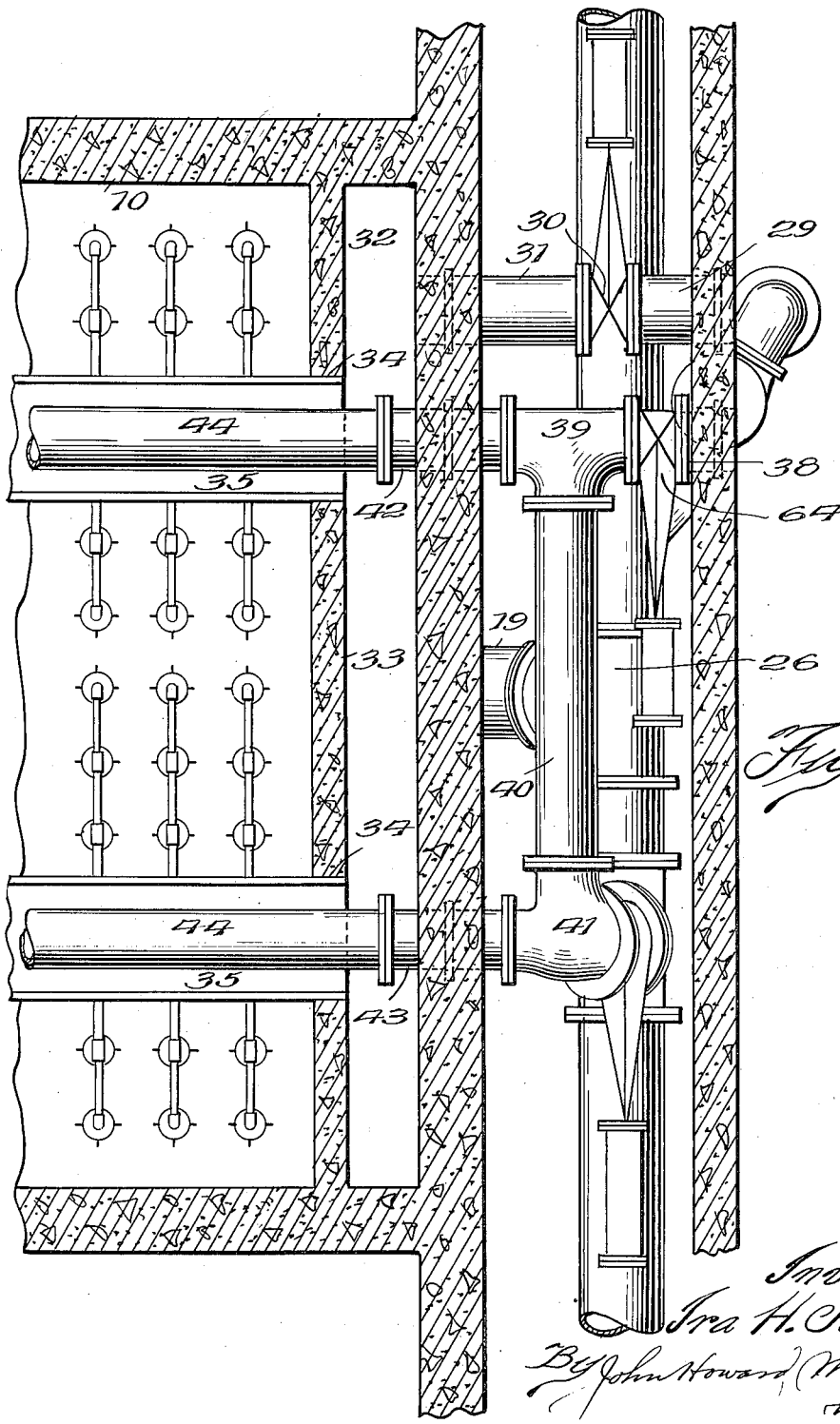
Fig. 2 is a plan view of the same structure in section on line 2—2 of Fig. 1.
Figure 3:
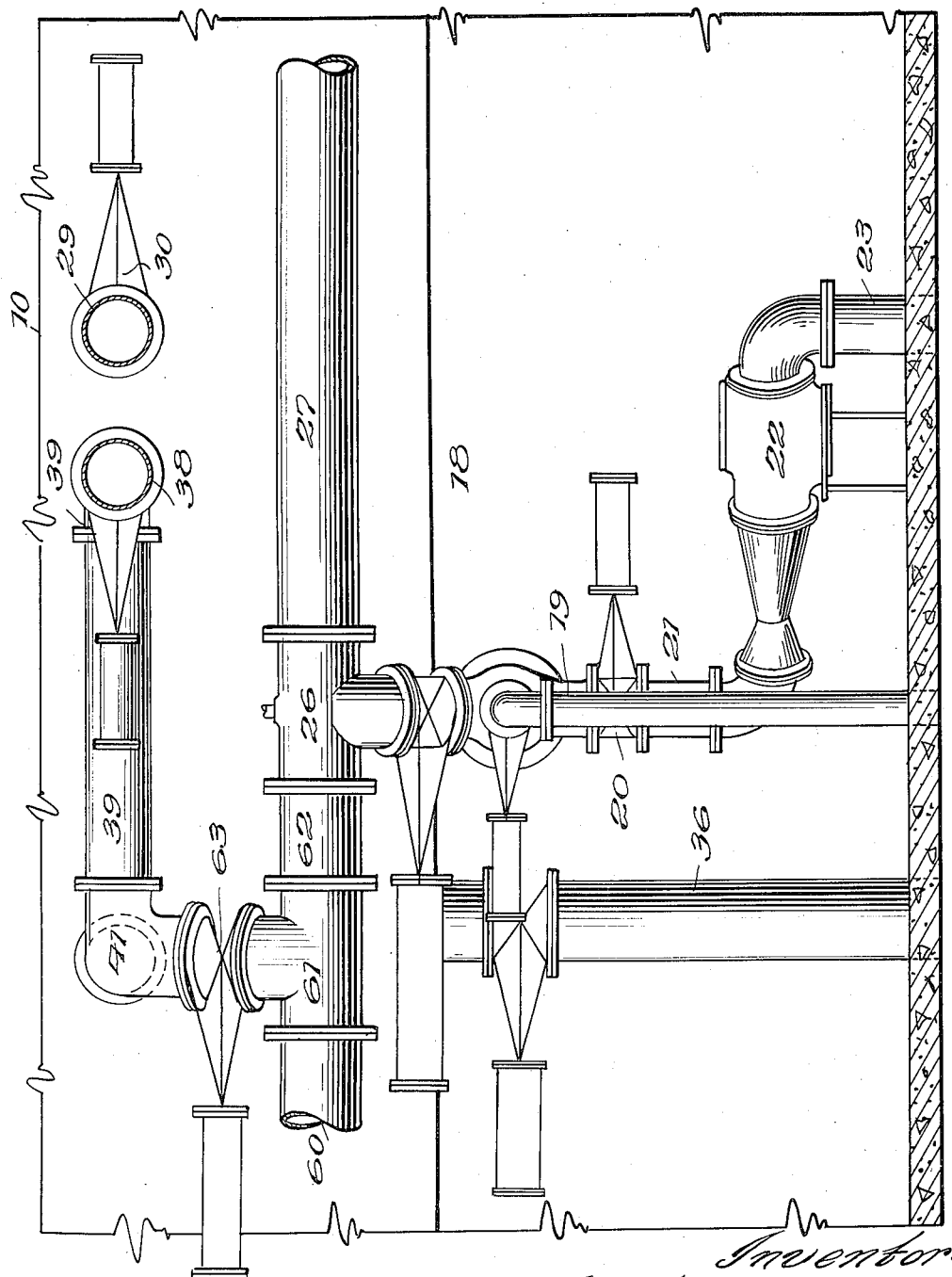
Fig. 3 is a front elevation as seen on the line 3—3 of Fig. 2.

In employing my invention, in addition to the influent pipe 29, I preferably employ the influent pipe 38, connected by the T 39 (as seen in Fig. 2) with the pipe 40, which in turn has the T 41 at its other end. The T's 39 and 41 are connected by the pipes 42 and 43 passing through the adjacent wall of the chamber 10 with the pipes 44, which I preferably utilize to form a portion of the bottom of the troughs 35, seen in Fig. 4, which have their other ends supported by the opposite wall of the chamber 10, so that the troughs support the pipes 44 throughout their lengths. These pipes 44 have depending therefrom at suitable intervals the connecting pipes 45, which are connected by T's at their lower ends to the horizontal pipes 46 (see Fig. 2) which in turn are connected by T's and L's with the short pipes 47 directly to the filter heads or members. These may be constructed as shown in Figs. 5 and 6 where it will be seen that the pipes 47 are screwed into the top of the conical castings 48, each of which has the annular flange 49 at its end adapted to fit into the complementary annulus 50 forming the top of the frame which has the plurality (preferably four) of strips 51 connecting the ring 50 with the bottom disk 52 which has the annular flange or bearing surface having the same internal angle as that of the ring 50. A clamping disk 53 has its periphery cooperating with this angle, so that the inverted truncated conical (in shape) screen 54 can be clasped tightly at both ends. This screen is preferably of a No. 35 rectangular mesh to prevent the entry of the filter sand which is usually of a .53 millimeter size. The disk 53 has the threaded bolt like extension 55 projecting centrally from the under side and passing through an aperture 56 in the center of the disk 53 and the nut 57 serves to draw the disk 53 tightly against the bottom of the screen 54. The parts of the entire head are tightly connected by the tube 58, perforated at intervals and screwed at its upper end into the boss 59 of the top piece 58, and at its lower end into the upper side of the disk 53.

For use in washing through the subsurface members, the wash water pipe 60, connected with a supply of filtered water under a strong pressure that can be regulated is connected to the T 61 to which the T 26 is also connected by the short pipe section 62, and the outlet of the T 61 is connected by the valve 63 with the T 41 with the result that by closing the valve 64 and opening the valve 63, a stream of wash water under any desired pressure can be forced through the pipes 44 and thence downward through the apertures in the pipes 58 against the screens 54 with a strong jet action that serves to cleanse thoroughly the screens from any material that may have been collected thereon during the filtering operation. The wash water passes through the screens 44 forming strong currents radiating into the sand bed in all directions. It will be noted that wash water from the screens will rise and spill over into the troughs 35 and be discharged through the pipe 36 into the sewer. It will also be noted that by proper operation of the various previously mentioned valves, all of which are operated by the customary hydraulic motors, shown but not numbered in the drawings, the surface and the subsurface filtration can be carried on simultaneously or separately as may be desired, and likewise the reverse flow and the washing through the screens can likewise be carried on separately or simultaneously, as may be desired.

It will be obvious that in order to secure any substantial amount of additional capacity by adding my subsurface filtration system, or a large capacity if it should be used alone, the area of the screens through which the water is discharged must be very considerable, and that in order for the water to pass through the entire screen surface, said screen surface must form a large part of the boundary of a large hollow space in which the water carried thereto by a relatively small pipe can spread out and accumulate, as it were, so as to cover the entire screen area, and thus produce a large sand surface that will necessarily be penetrated by the water to be filtered.

As seen in Figs. 1 and 7, the large screen surfaces are located far enough beneath the surface of the sand so that during the filtering operation, the water flowing therefrom does not disturb the surface of the sand bed or break up the coating formed by the coagulant, so that the entire surface of the sand bed (which is lessened only by the passing therethrough of the pipes 45 carrying the screens) operates substantially as effectively as if no subsurface filtration were employed. The inclined top castings 48 serve to deflect the water filtered by the surface of the sand bed to the open spaces between the screen members, and the water flowing therefrom will prevent the surface filtered water from passing close enough to the surface of the screens to permit of its being contaminated by the filth in the sand lying against the outer surfaces of the screens. The necessary depth of the screens beneath the surface of the bed will be determined by the character of the sand or other equivalent filtering material that may be employed.

It will be obvious that to secure the desired additional capacity without substantially reducing the capacity of the surface filtration, the subsurface water must be passed through the surface of the sand in pipes, which must have screen surfaces attached to their ends in a manner to form hollows surrounded by the screens, as if screens of the area of the cross section of the pipes only were employed, no additional filtering capacity would be secured.

I have found that in the practical use of my invention I can successfully employ in a sand filter bed of the ordinary depth a total area of screen surface for the several heads, which I preferably locate about 15 inches apart each way, equal to 50% of the superficial area of the sand bed, thus increasing its filtering capacity by not less than the same percentage. In fact, test runs with that amount of relative screen area have sometimes resulted in increasing the total capacity of the filter 100% showing that the filtration through the screens is more efficient for the same area than that through the surface of the sand beds.

In washing the filter through the heads, the wash water is driven therefrom in the same manner as the water to be filtered, but at a greatly increased pressure, thereby increasing the volume per minute, and where the sand is at the same time expanded by washing it in the customary manner by wash water rising vertically therethrough, I have found that the cross currents, so to speak, of wash water are very efficient.

While I may wash the sand through the heads or members alone where only a surface washing is needed, I preferably at times employ simultaneously therewith the regular washing system provided by reversing the flow through the effluent means shown in Figs. 7 and 8, as I have found by experience that a superior result is obtained when both washing means are employed simultaneously as compared with either separately. As I preferably wash the sand under normal conditions, the pressure of the water rising vertically through the sand is only sufficient to expand the sand, i. e., lift it so that it becomes somewhat fluid as it were in its action, but not enough to stir it up as much as is now deemed necessary to get the best washing as heretofore practiced. In my improved method of washing, the rise of the sand bed due to this vertically rising water is normally about 4 to 6 inches, being varied according to the condition of the sand bed. The jets of water under considerable pressure, eject a much larger volume of water (ordinarily enough to cause an additional rise of 24 to 26 inches, making a total rise of 30 inches) and moving laterally and slightly downwardly from the heads impinging against this expanded sand sets the grains in horizontal radial movement from around each head, with the result that the grains meeting those from the surrounding heads moving in opposite and different directions grind against each other, producing a rubbing and scouring action which keeps the grains clean and prevents any foreign material adhering to them and ultimately forming what are known in the art as "mud balls," which when they accumulate in sufficient quantity necessitates the removal of the entire sand bed to get rid of them. With my novel method of washing sand I prevent entirely their formation, even under conditions most favorable to such formation.

In the operation of a municipal filter plant constructed and operated in accordance with the foregoing disclosure, I have found by an analysis of the filter sand that the top surface for a depth of a quarter of an inch has an effective size of .468 millimeter and that at a depth of twelve inches below the surface the effective size is .530 millimeter. The top surface uniformity coefficient is 1.24, while at twelve inches below said uniformity coefficient it is 1.27. This difference is so slight that the retention of impurities retained in the floc and at the interstices of the sand grains is practically uniform throughout the entire depth of the sand where the filtering action, both surface and sub-surface, occurs, and good filtration is effected surrounding the heads as well as at the surface. This uniformity is due to my novel method of washing the sand, so that the success of my novel method of filtration per se is due largely to my novel method of washing. The depositing of all fine sand at the surface and the coarser sand below, which results from methods of washing heretofore used, does not occur where my novel washing method is employed.

From the foregoing, it will be apparent that, thanks to the greatly increased filtering capacity for the same area of sand bed, and thanks to the faster and better washing with less consumption of filtered water for washing, by combining my novel methods of filtering and washing, I am enabled to secure a greater capacity at less expense of construction, and that I operate more cheaply than is possible with the filters of this type that have been heretofore used.

While I have shown and described my invention as carried out by the methods and with the apparatus which I at present consider best adapted to carry out its purposes, it is capable of modifications and that I do not desire to be limited in the interpretation of the following claims except as may be necessitated by the prior art.

What I claim is new, and desire to secure by Letters Patent of the United States is:

1. The method of filtration for use in large filters which consists in applying a head of water to the entire surface of a bed of loose filtering material confined only at its sides and bottom and simultaneously introducing water into the bed beneath the surface thereof through fine mesh screens of considerable area in proportion to the surface of the bed forming hollows in which water can spread before passing through the screens into the bed, and carrying off the filtered water from beneath the material by which the bed is supported.

2. The method of filtering for use in waterworks type of filters, which consists in applying a head of water to the entire surface of a bed of loose filtering material confined only at its sides and bottom and simultaneously introducing water into the bed through a fine mesh screen or screens far enough below said surface so that the water issuing therefrom will not affect it, said screen or screens surrounding a hollow space or spaces in the bed into which the water is introduced by means which do not materially reduce the effective surface of the bed, and carrying off the filtered water from beneath the material by which the bed is supported.

3. The method of rapidly washing the loose filtering material constituting the bed of large gravity filter plants without removing it which consists in expanding the upper portion of the material by a current of wash water rising throughout its entire superficial area and simultaneously strongly injecting conflicting streams of wash water of many times greater quantity than the current throughout an entire horizontal layer of expanded material near its surface so as to cause it to be secured by the conflicting movements of the material resulting therefrom, and carrying off the polluted wash water by overflowing the edges of associated outlets located at intervals relative to the entire surface of the bed.

4. The method of securing a maximum capacity for large rapid sand filters which consists in (1) passing the treated water simultaneously through heads each having a large screen surface surrounding cavities and located suitably spaced apart a few inches below the surface of the sand and through the surface of the bed, and (2) washing the sand by passing clean wash water through the heads at many times the rate through which the treated water passes in filtering.

5. The method of improving and maintaining the efficiency of filters which consists in applying the influent water to the surface of the sand bed, and through fine mesh screens located beneath said surface and of considerable area relatively to the surface area; and cleansing the screens and upper portion of the bed by applying wash water outwardly through said screens at a pressure much greater than that of the water to be filtered.

6. In a large gravity filter, the combination with a chamber, of a bed of loose filtering material therein confined only at its sides and bottom, effluent means in the bottom thereof adapted either to carry off filtered water from the bed or to supply wash water thereto throughout its entire area, troughs extending at intervals across the chamber well above the surface of the bed and adapted either to allow water to be filtered to overflow therefrom onto the entire surface of the bed or to allow wash water rising through the bed to spill thereinto and be carried off thereby, discharge members imbedded in the material at frequent intervals throughout the bed, beneath the surface thereof, and spaced away from the side walls of the chamber and adapted to permit water to be discharged therefrom either for filtration or for washing the material, said discharge members being provided with means for preventing water from being discharged directly upward therefrom, piping connected to the discharge members for delivering water to the discharge members to be ejected therefrom, and valves for determining which kind of water is supplied thereto.

7. The method of rapidly washing the loose filtering material constituting the bed of large gravity filtration plants without removing it, which consists in expanding the upper portion of the material by a current of wash water rising throughout its entire superficial area and simultaneously injecting conflicting streams of wash water throughout an entire horizontal layer of expanded material near its surface so as to cause it to be scoured by the conflicting movements of the material in the expanded portion resulting therefrom, and carrying off the polluted wash water through associated outlets located at intervals relative to the entire surface of the bed, said conflicting streams uniting to make a greater quantity of wash water than is furnished by the wash water rising alone through the bottom of the bed in the same length of time.

8. In a filter, the combination with a sand bed, of a filtration member submerged therein, and means for supplying said member with either water to be filtered or wash water under pressure, said member consisting of a central perforated pipe to receive the water initially, heads at the ends of the pipe, and a cylindrical screen of fine mesh wire secured to the heads and spaced away from the pipe so that in washing the sand, the jets of water projected through the perforations of the pipe strike the screen directly and cleanse it from any matter adhering thereto before passing on into the sand to wash it.

9. The method of rapidly washing the granular material constituting the bed of gravity filter plants without removing it which consists in delivering powerful conflicting streams of water of large volume into the upper portion of said bed near its surface, to break up all masses of accumulated impurities and thoroughly scour and release the granular material from said impurities while simultaneously applying an upward flow of water relatively small in volume, throughout the entire bed from its bottom to assist in carrying off the released impurities while in suspension by overflowing the edges of associated outlets located at intervals relative to the entire surface of the bed.

10. In a filter, the combination with a filter chamber provided with troughs for delivering the water to be filtered and carrying off the wash water, of a bed of loose filtering material below said troughs, inlet and effluent means, water supply piping extending adjacent the troughs, and a plurality of members submerged in the bed and through which water supplied to the piping is discharged, said members being supported by the troughs.

IRA H. JEWELL.